July 15, 1969　　　　　R. L. PHILLIPS　　　　　3,455,407
FOUR WHEEL DRIVE VEHICLE AND POWER TRAIN
Filed May 25, 1967　　　　　　　　　　　　　　2 Sheets-Sheet 2

INVENTOR.
Ronald L. Phillips
BY
Ronald L. Phillips
ATTORNEY

United States Patent Office 3,455,407
Patented July 15, 1969

3,455,407
FOUR WHEEL DRIVE VEHICLE AND POWER TRAIN
Ronald L. Phillips, Southfield, Mich., assignor to General Motors Corporation, Detroit, Mich., a corporation of Delaware
Filed May 25, 1967, Ser. No. 641,238
Int. Cl. B62d 7/00, 9/00; B60k 17/30
U.S. Cl. 180—44　　　　　　　　　　　11 Claims

ABSTRACT OF THE DISCLOSURE

A four-wheel drive vehicle having a power train apportioning prime mover power between the driving wheels by variable power capacity hydrodynamic torque converters which are controlled either manually or by a vehicle acceleration sensor to match wheel power to varying wheel load.

---

This invention relates to a vehicle having several driving outputs driven by a variable power capacity power train and more particularly to a variable power capacity power train providing controlled apportionment of prime mover power between multiple power train outputs.

In order to make maximum use of available engine torque and power in a four-wheel drive vehicle, for example, the tractive limits of all the driving wheels should be approached simultaneously to prevent the wheels carrying the smaller percentage of the vehicle weight from slipping prior to slippage of the heavier loaded wheels; the tractive limit for each wheel being the vertical load on the wheels multiplied by the coefficient of friction between the wheel and supporting road surface. It is well known that the static weight distribution between the front and rear wheels is generally not evenly proportioned because of passenger comfort considerations and/or engineering principles and that on forward vehicle acceleration there occurs a transfer of weight to the rear wheels. In normal vehicle suspension systems, the weight transfer increases with acceleration. Since the tractive limit is related to wheel load, the tractive limit at the wheels changes with vehicle acceleration.

The present invention is illustrated in a vehicle having a front driving axle and wheels, a rear driving axle and wheels and a prime mover for powering the axles and wheels. The power train includes a variable power capacity hydrodynamic torque converter operatively drivingly connecting each driving axle and wheels to the engine. Control linkage including a manually operable selector and a vehicle acceleration sensor is operatively connected to the torque converters to control the extraction of power from the engine to apportion power to all of the driving wheels either by manual control or as determined by vehicle acceleration so that the tractive limits at all of the driving wheels are reached substantially simultaneously.

An object of the present invention is to provide a power train having a variable power capacity unit drivingly connecting each one of a plurality of vehicle driving devices to a prime mover with controls connected to the variable power capacity units to control the extraction of prime mover power to match the power deliveries to meet the varying loads.

Another object of the present invention is to provide a vehicle having multiple driving axles and wheels with variable power capacity hydrodynamic torque converters for apportioning power between the driving wheels with the power apportionment varied by manual and load shift responsive control.

Another object of the present invention is to provide in a vehicle having multiple driving axles and wheels whose tractive limits vary with load which is determined at least in part by vehicle acceleration, a power train including hydrodynamic torque converter means for transmitting engine power by separate power paths to the driving axles with the power capacity of each converter determined by a variable pitch stator and controls connected to the variable pitch stators including a selectively operable manual controller and a vehicle accelerator sensor for simultaneously controlling the pitch of the torque converter stators to vary the power capacities of the power paths to provide controlled power apportionment between the driving axles so that the varying tractive limits of all the wheels are approached simultaneously.

These and other objects of the invention will be more apparent from the following description of the preferred embodiment of the invention illustrated in the drawing in which:

FIGURE 1 diagrammatically shows a vehicle having a power train embodying the features of this invention connected to provide four-wheel drive.

Figure 1:
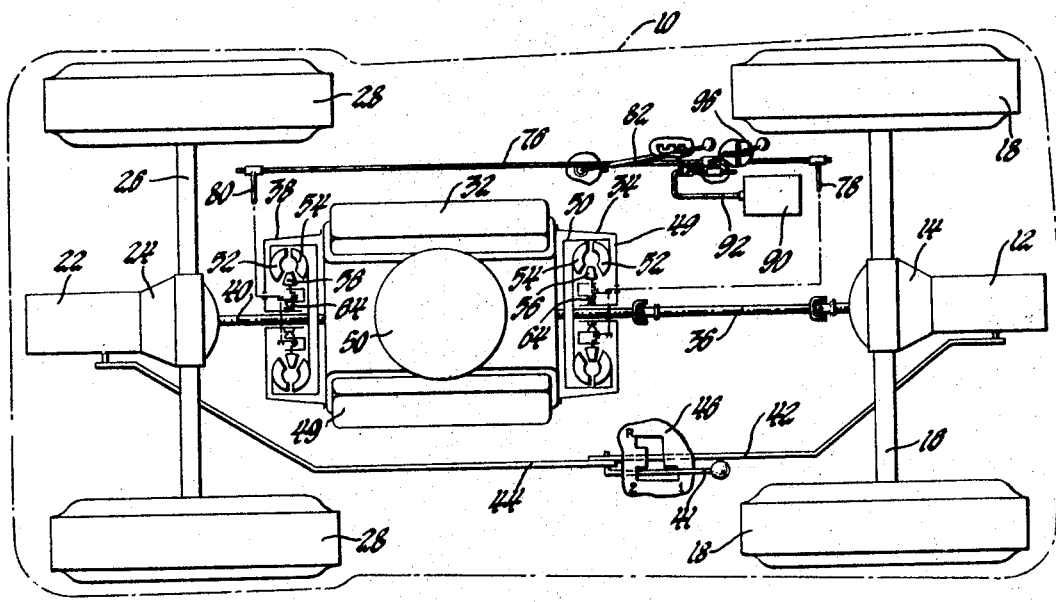

The invention is illustrated by the four-wheel drive vehicle which is generally designated as 10 in FIGURE 1 and comprises a front wheel drive assembly having a two-speed gear box 12 connected by a differential 14 and separate drive shafts in an axle housing 16 to drive the front wheels 18. The rear wheel drive assembly has a two-speed and reverse gear box 22 connected by a differential 24 and separate drive shafts in an axle housing 26 to drive the rear wheels 28. The components thus far described may be conventional. The vehicle has an internal combustion engine 32 whose crankshaft is connected at the front end by a hydrodynamic torque converter 34 and a propeller shaft assembly 36 to the front gear box 12. The engine's crankshaft is connected at the rear end by a similar hydrodynamic torque converter 38 and a short propeller shaft 40 to the rear gear box 22. Suitable suspension, not shown, supports the major portion of the vehicle weight on the wheels.

The gear boxes 12 and 22 are simultaneously and manually shifted by the operator by shift linkage which includes a shift lever 41 located in the operator's compartment and connected by the control rods 42 and 44 to operate the usual shift forks in the gear boxes 12 and 22, respectively. The shift lever 41 operates in a gate 46 and, with the connecting linkage provided, effects simultaneous conditioning of both gear boxes for either a first or low speed range four-wheel drive 1 or a second or high speed range four-wheel drive 2 as designated on the gate. Reverse is obtained by moving the shift lever to the reverse position R. In reverse the linkage conditions the front gear box 12 in neutral and the rear gear box 22 for its reverse speed ratio to provide two-wheel drive as compared with the four-wheel drive in the two forward speed ranges. Where four-wheel drive in reverse is desired, the front gear box is provided with a reverse speed ratio like the rear gear box.

According to the present invention the hydrodynamic torque converters in the power train have similiar components and are of the variable power capacity type. Since the front and rear converters are similar the following description applies to each converter unit. Each converter comprises a stationary converter housing 49 secured to the engine block and enclosing a rotary torque converter housing 50 which is driven by the engine crankshaft and connected to drive the torque converter pump 52 in a forward direction. The engine power absorbed by the converter pump is transmitted to drive the turbine 54 in the forward direction by means of hydraulic oil flow. The turbine 54 on which the oil impinges transmits torque to the propeller shaft 36 or 40, the converter power output being derived from the torque applied on the turbine and the speed at which it is turning. The stator 56, in turn, when prevented from backward rotation provides reaction to direct the oil back into the pump in the direction of pump rotation to effect torque multiplication as in the conventional manner.

Converter power capacity is dependent on the amount of torque the pump element will absorb at a given speed. This absorption ability is generally determined by the physical size of the converter; however, within a given size the power capacity can be changed by changing the converter pump and stator blade angles. As long as these blade angles are fixed, each converter has a fixed power absorption ability bearing in mind that a torque converter is usually selected to take advantage of the full-throttle power available from a given engine.

Figure 3:
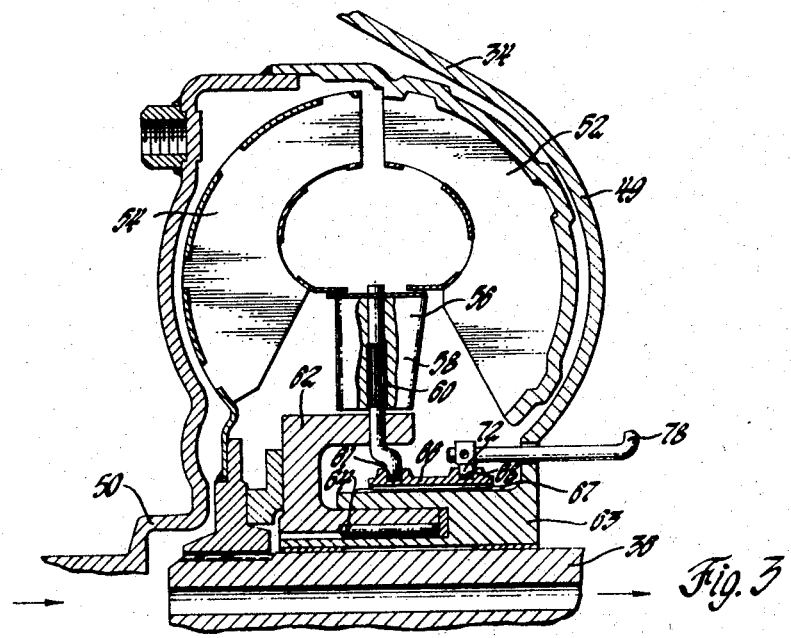
FIGURE 3 is an enlarged longitudinal partial sectional view of one of the hydrodynamic torque converters.

As best shown in FIGURE 3, the torque converters have the ability to change power capacity by the mounting of the individual stator blades 58 of the stator 56 on bell cranks 60 which are journaled on a stator hub 62. The stator hub 62 is grounded to a hub 63 provided on the stationary converter housing through a one-way brake 64 of the roller-cam type. Brake 64 holds the stator hub and thus the stator blades 58 against backward rotation but permits their forward, free-wheel rotation to enable the converter to operate as a fluid coupling in the usual manner when the turbine is rotating at a speed approaching engine speed. The radially inward ends of the bell-cranks 60 are received in one external, annular groove 61 of an annular stator-angle-control sleeve 66. Sleeve 66 is mounted for reciprocating movement by splines 67 on stationary hub 63, the splines preventing sleeve rotation. Sleeve 66 has another external annular groove 68 in which is received a fork 72 for reciprocating the sleeve 66, the angle of the stator blades being changed by the sleeve movement in direct relationship.

Since the stator returns the oil from the turbine back to the pump and in the same direction as the pump is turning, the amount of engine torque required to accelerate the oil back to its normal velocity level in the pump is only the difference between the oil flow being returned by the stator and the maximum flow rate and direction provided by the pump. It is this difference that determines the converter's power capacity. When the stator blades are at their lowest angle which is commonly referred to as the open stator position and measured from the axis of converter rotation, the oil enters the pump from the stator in a direction requiring the high engine torque to maintain the pump at a given speed resulting in relatively high power absorption. When the variable pitch stator is pivoted to increased angles, the oil enters the pump from the stator in directions reducing the amount of engine torque required to maintain the same pump speed with the stator at the low angle, i.e. decreased power absorption. At the highest stator blade angle which is commonly referred to as the closed stator position, the power capacity is thus relatively low. The relationship between stator and pump oil flow angle remains the same with the turbine rotating at higher speed ratios and thus, the converter power capacity is changed throughout the converter output speed range by changing the stator blade angle. These operating principles of power capacity change by changing the stator angle are well known.

When the stator-angle-control sleeve 66 is in the position shown in FIGURE 3, the stator blades 58 are at their lowest angle (open position) which determines the maximum power absorption capacity of the converter. As sleeve 66 is moved or pushed by its fork 72 which would be in a direction toward the engine in the particular construction, the stator angle is changed from the low angle to decrease the power absorption capacity of the converter until the highest angle is reached which determines the minimum power absorption capacity of the converter, the available number of intermediate stator angles being infinite and thus providing infinitely variable converter power absorption capacity between the maximum and minimum values.

Figure 5:
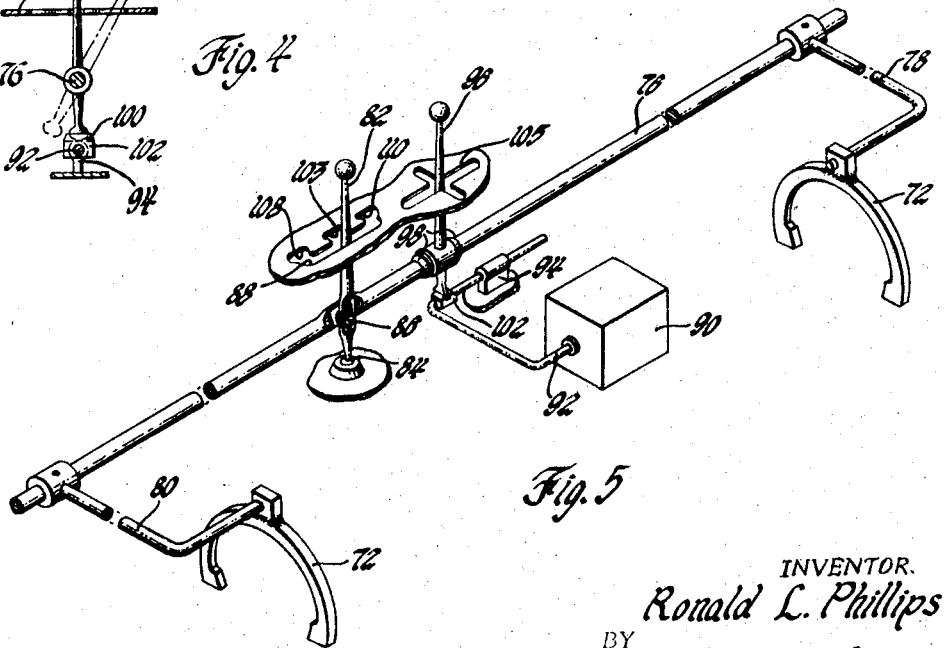
FIGURE 5 is an enlarged perspective view of the power capacity control linkage.

Further in accordance with the present invention, there is provided power capacity control linkage means including a manual control and a wheel load change sensing control selectively connectible to both the variable power capacity converters to simultaneously control their stator pitch angles and thus the power capacity of the converters to apportion engine power between the front and rear driving wheels so that their tractive efforts approach their tractive limits simultaneously during varying wheel loading. As shown in FIGURES 1 and 5, the control means comprises mechanical linkage having a control rod 76 extending longitudinally of the vehicle on the side of the engine opposite the gear shift linkage. Arms 78 and 80 rigidly connected to the front and rear ends, respectively, of rod 76 extend radially therefrom and then make a right-angle bend and extend freely through apertures provided in the front and rear stationary converter housings. The arms 78 and 80 are rigidly connected inside the stationary converter housings to the respective forks 72 engaging the respective stator-angle-control sleeves 66. Assuming for the moment that the stator angle in both converters 34 and 38 is at some intermediate power absorption angle, forward movement of rod 76 as viewed in FIGURE 1, i.e. movement towards the right, pivots the front converter stator blades to lower angles thereby increasing the power capacity of the front converter while at the same time the stator blades in the rear converter 38 are pivoted to higher angles thereby decreasing the power capacity of the rear converter. The opposite is true upon rearward movement of rod 76, i.e. the power capacity of the rear converter increasing while the power capacity of the forward converter decreases.

The rod 76 may be moved either manually or automatically in response to changes in wheel loading to provide the desired power apportionment between the front and rear driving wheels. The manual control is provided by a hand lever 82 located in the driver's compartment, the lever 82 being pivoted at its lower end by a universal joint connection 84 mounted on the vehicle floor and having a pin and slot connection 86 at a intermediate point near the lower end to the rod 76. Lever 82 operates in a gate 88 which permits fore and aft movement of the lever 82 to move the rod longitudinally and also has any number of slots which may be three as shown to hold the lever 82 and thus both of the variable pitch stators in selected positions.

Figure 4:
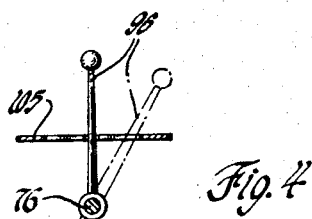
FIGURE 4 is an enlarged end view of part of the power capacity control linkage.

For the automatic control there is provided means for sensing fore and aft wheel load change which may be in the form of a hydraulic accelerometer device 90 such as that shown and described in United States Patent No. 3,147,625 to R. N. Green. During vehicle acceleration there will occur weight shifts and corresponding changes in vertical wheel load and in accordance with the present invention the accelerometer device is calibrated to provide an output correlated to wheel load change to automatically position control rod 76 and thus both stators to produce the desired power proportionment. The output of the hydraulic accelerometer device is taken from a rod 92 which is located to move longitudinally of the vehicle, rod movement also being guided by a floor mounted bearing support 94 which accepts the other arm of the U-shaped rod 92. The hydraulic accelerometer is selectively connectible to move rod 76 by means of a hand lever 96 which is journaled at an intermediate point on rod 76 for angular or pivotal movement about the axis of rod 76 and is prevented from axial movement relative thereto by sandwiching collars 98 secured to rod 76. As shown in FIGURES 1, 4 and 5, the lower end of lever 96 is receivable in a slot 100 extending transverse to rod 76 provided in a collar 102 rigidly secured to one arm of the hydraulic accelerometer's output rod 92. Lever 96 operates in a gate 105 which permits pivotal movement of the lever 96 to the position shown in FIGURE 5 (full-line position shown in FIGURE 4). In this position, lever 96 engages the collar 102 to provide a rigid mechanical connection between the hydraulic accelerometer's output rod 92 and control rod 76, the gate permitting fore and aft movement of lever 96 with rod 76. Alternatively, the lever 96 can be pivoted in the gate on the rod 76 to the dashed-line position shown in FIGURE 4 to disengage the lever's lower end from the control rod 76 to disconnect the accelerometer device from the stators.

Operation

Describing now a typical set-up and operation of the vehicle and power train, it will be assumed for illustrative purposes that under static vehicle conditions the front driving wheels bear 40% of the total vertical vehicle load and the rear driving wheels bear the remaining 60%. Furthermore, it will be assumed that during the low speed acceleration there occurs a rearward weight shift resulting in the front wheels bearing 30% of the load and the rear wheels bearing the remaining 70%. At high speed acceleration there is less weight shift and it will be assumed that the front wheels bear 35% of the vertical load and the rear wheels bear the remaining 65%. At terminal vehicle speed it will be assumed that the wheels resume their static loading conditions.

According to the present invention the power train provides for apportioning or splitting the power between the front and rear driving wheels to make maximum use of the available engine torque and power so that the tractive limits of all the driving wheels are approached simultaneously to prevent the wheels carrying the smaller percentage of the vehicle weight, in this instance the front driving wheels, from slipping prior to slippage of the heavier loaded rear driving wheels. Knowing that the front driving wheels should absorb between 30–40% of the engine power and the rear driving wheels the remaining 60–70% during full range vehicle operation, the front torque converter 34 is provided with a low power capacity and the rear torque converter 38 with a high power capacity to establish a power split at a given stator angle to produce tractive efforts at the front and rear wheels at some particular tractive limit condition. This may be accomplished by the more conventional practice of determining the proper physical size of the converter, e.g. providing the rear converter with a larger flow path diameter than the front converter, or by employing two converters of a given size with their difference in power capacities being obtained by proper design of the converter pump and stator blade angles assuming the stator blades are fixed which may be at some intermediate stator angle. For example, with the stator blades at some intermediate position or angle the front converter may be designed to absorb 35% of the available engine power and the rear converter designed to absorb the remaining 65%, these power absorption levels being midway between the lowest and highest.

Figure 2:
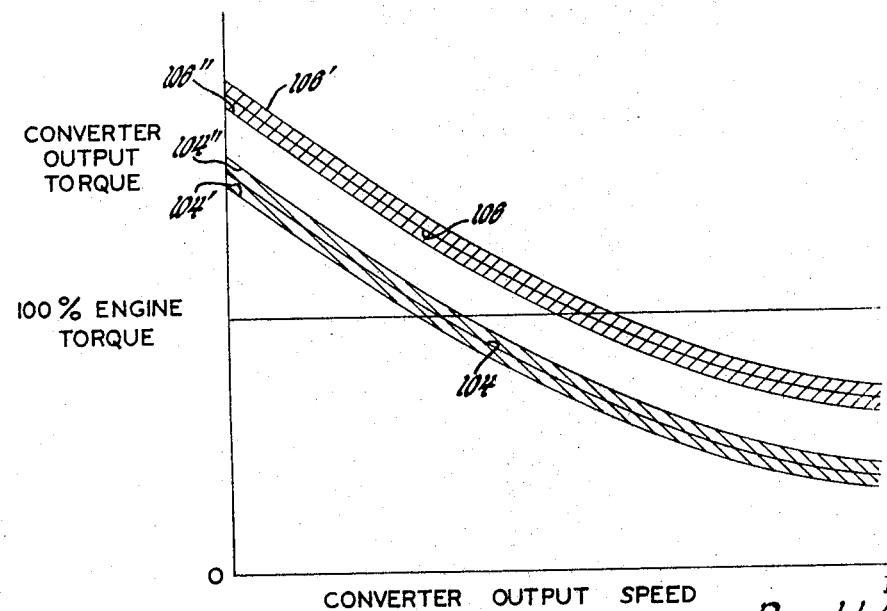
FIGURE 2 shows typical operating curves of the power train.

Assuming that the operator wishes to manually operate the stator pitch angle control, he disengages the lever 96 from the collar 102 to disconnect the automatic stator pitch angle control and operates the manual lever 82 to control the power apportionment. At the intermediate hand lever position and regardless of the forward drive range selected by operation of the gear shift lever 41 the torque converters split the power between the front and rear driving wheels in the ratio of 35% to the front driving wheels and the remaining 65% to the rear driving wheels. The operator may either hold the power apportioning control lever 82 in this mid-position or engage it to be held by the intermediate slot 103 of gate 88. FIGURE 2 shows typical operating characteristics of the converters, curves 104 and 106 illustrating the respective front and rear converter output torques in relation to constant 100% or full-throttle engine torque over the converters' speed range at the 35–65% power split.

When the driver effects low speed vehicle acceleration he pulls the hand control lever 82 rearwardly or to the left as viewed in the drawing and thereby increases the stator angle in the front converter to decrease the power delivery to the front wheels whose load has decreased while simultaneously decreasing the stator angle in the rear converter to increase the power delivery to the rear wheels whose load has increased. This change in the power proportionment which may be finely controlled by the operator is illustrated by upward shifting of the rear converter output torque curve and downward shifting of the front converter output torque curve. At the lowest stator angle in the rear converter and the highest stator angle in the front converter, the rear converter output torque curve will have been displaced to its maximum as indicated at 106' and the front converter output torque curve 104 displaced to its minimum as indicated at 104' giving a 70–30% power split rear and front. The gate 88 has a slot 108 for holding the hand lever 82 and thus the front and rear stators at their highest and lowest angles, respectively.

For acceleration at higher speeds the operator pushes the hand lever 82 forward or to the right from its mid-position to decrease the front stator angle to increase power delivery to the front wheels while simultaneously increasing the rear stator angle to decrease power delivery to the rear wheels. This shifts the front converter output torque curve upwardly and the rear converter output torque curve downwardly. At the lowest stator angle in the front converter and the highest stator angle in the rear converter, the front converter output torque curve 104 will have been displaced to its maximum as indicated at 104'' and the rear converter output torque curve 106 will have been displaced to its minimum as indicated at 106''. The gate 88 has a slot 110 for holding the hand lever 82 and thus the front and rear stators at their lowest and highest angles, respectively.

Thus, the operator need merely pull back on the lever 82 to deliver more power to the rear driving wheels and less power to the front driving wheels and vice versa. Furthermore, the power apportionment is infinitely variable within the bands determined by the converter output torque curves 104'–104'' and 106'–106''. The operator can hold the hand lever 82 at any position between the two extreme positions and there may also be provided additional gate slots.

Alternatively, when the operator desires automatic control of the power apportionment he pivots the lever 96 to engage the collar 102 to connect the hydraulic accelerometer 90 to control the stators and positions the manual stator pitch control lever 82 for free fore and aft movement in gate 88. The hydraulic accelerometer senses the forward vehicle acceleration and is calibrated to position the rod 76 to hold the variable pitch stators of the front and rear converters at angles correlated to effect power distribution between the front and rear driving wheels in relation to their different loads. Where a more direct read-out of wheel load change to control the stator angles is desired, suitable conventional load detectors may be employed at the wheels to provide signals indicating wheel load for controlling a suitable conventional slave unit to operate rod 76.

The above-described preferred embodiment is illustrative of the present invention.

I claim:

1. A vehicle having a plurality of road engaging tandem related traction means subject to varying loads; prime mover means; power train means including variable speed change means and variable power capacity means operatively drivingly connecting each said traction means to said prime mover means and control means operatively connected to all of said variable power capacity means for simultaneously varying the power capacity of all of said variable power capacity means to meet the varying loads irrespective of the variable speed change means.

2. The vehicle defined in claim 1 and said control means including vehicle acceleration sensing means operable to vary the power capacities in relation to vehicle acceleration to provide all said traction means with tractive efforts approaching their tractive limits simultaneously during vehicle acceleration.

3. The vehicle defined in claim 1 and said control means including manual control means operable to control the power capacities.

4. The vehicle defined in claim 1 and each of said variable power capacity means comprising a hydrodynamic torque converter having a variable pitch stator controlled by said control means.

5. The vehicle defined in claim 4 and said control means including load change sensing means for automatically varying the power capacities.

6. The vehicle defined in claim 4 and said plurality of road engaging traction means comprising front and rear driving wheels with different loads at an intermediate loading condition, said converters having different power capacities at an intermediate stator angle to provide power apportionment between the front and rear wheels in relation to the loads at the intermediate loading condition, said control means comprising linkage means operatively connected to both said stators for simultaneously changing the angle of both said stators from their respective intermediate stator angles in both angular directions but in opposite sense to simultaneously increase the power capacity of one converter and decrease the power capacity of the other converter.

7. A vehicle having a plurality of road engaging traction means subject to varying loads; prime mover means; power train means including variable power capacity means operatively drivingly connecting each said traction means to said prime mover means; control means operatively connected to all of said variable power capacity means for simultaneously varying the power capacity of all of said variable power capacity means to meet the varying loads and said control means including vehicle acceleration sensing means operable to vary the power capacities in relation to vehicle acceleration to provide all said traction means with tractive efforts approaching their tractive limits simultaneously during vehicle acceleration.

8. A vehicle having a plurality of road engaging traction means subject to varying loads; prime mover means; power train means including variable power capacity means operatively drivingly connecting each said traction means to said prime mover means; control means operatively connected to all of said variable power capacity means for simultaneously varying the power capacity of all of said variable power capacity means to meet the varying loads; each of said variable power capacity means comprising a hydrodynamic torque converter having a variable pitch stator controlled by said control means and said control means including load change sensing means for automatically varying the power capacities.

9. A vehicle having a plurality of road engaging traction means subject to varying loads; prime mover means; power train means including variable power capacity means operatively drivingly connecting each said traction means to said prime mover means; control means operatively connected to all of said variable power capacity means for simultaneously varying the power capacity of all of said variable power capacity means to meet the varying loads; each of said variable power capacity means comprising a hydrodynamic torque converter having a variable pitch stator controlled by said control means; said plurality of road engaging traction means comprising front and rear driving wheels with different loads at an intermediate loading condition; said converters having different power capacities at an intermediate stator angle to provide power apportionment between the front and rear wheels in relation to the loads at the intermediate loading condition; said control means comprising linkage means operatively connected to both said stators for simultaneously changing the angle of both said stators from their respective intermediate stator angles in both angular directions but in opposite sense to simultaneously increase the power capacity of one converter and decrease the power capacity of the other converter.

10. In a power train, a pair of hydrodynamic torque converters each having a variable pitch stator which is operable upon stator angle change to change converter power capacity; control means operatively connected to change the angle of both said stators for simultaneously increasing the power capacity of one converter and decreasing the power capacity of the other converter and said control means including load change sensing means for varying the power capacities in relation to load on the converters.

11. In a power train, a pair of hydrodynamic torque converters each having a variable pitch stator which is operable upon stator angle change to change converter power capacity; control means operatively connected to change the angle of both said stators for simultaneously increasing the power capacity of one converter and decreasing the power capacity of the other converter; said converters having different power capacities at an intermediate stator angle and said control means comprising linkage means operatively connected to both said stators for simultaneously changing the angle of both said stators from their respective intermediate stator angles in both angular directions but in opposite sense.

References Cited

UNITED STATES PATENTS

| 2,352,483 | 1/1944 | Jandasek | 74—732 X |
| 2,136,692 | 11/1938 | Johnson | 180—44 |
| 2,768,536 | 10/1956 | Wolfram | 74—664 |
| 2,932,940 | 4/1960 | Edsall et al. | 60—12 |

FOREIGN PATENTS 722,389  11/1965  Canada.

A. HARRY LEVY, Primary Examiner

U.S. Cl. X.R.

74—645, 665; 60—12, 54; 180—49, 70